United States Patent [19]
DePuy

[11] 3,739,274
[45] June 12, 1973

[54] DIRECT CURRENT MEASURING SYSTEM

[75] Inventor: Robert P. DePuy, Cherry Hill, N.J.

[73] Assignee: General Electric Company, Philadelphia, Pa.

[22] Filed: July 29, 1971

[21] Appl. No.: 167,406

[52] U.S. Cl. .............. 324/120, 324/111, 324/127, 324/130
[51] Int. Cl. .......................... G01r 1/22, G01r 1/02
[58] Field of Search .................. 324/120, 127, 130, 324/111, 130, 103

[56] References Cited
UNITED STATES PATENTS

| | | | |
|---|---|---|---|
| 3,289,079 | 11/1966 | Ferguson | 324/103 |
| 3,509,460 | 4/1970 | Mizrahi | 324/130 |
| 3,411,087 | 11/1968 | Vogel et al. | 324/127 |
| 3,242,489 | 3/1966 | Leyde | 324/130 |
| 3,541,446 | 11/1970 | Prozeller | 324/130 |

Primary Examiner—Rudolph V. Rolinec
Assistant Examiner—Ernest F. Karlsen
Attorney—J. Wesley Haubner and Albert S. Richardson, Jr.

[57] ABSTRACT

A current measuring system for use in a direct current electrical system wherein the magnitude of direct current is periodically reduced to zero. A sensor or pick up device generates a signal proportional to the time rate of change of current, and this signal is integrated in an integrator to produce an output signal whose waveshape is a substantial replica of the original current. A direct current restorer circuit is provided in conjunction with the integrator in order to reduce errors due to drift of the output signal during intervals of zero current. This measuring system may be advantageously used to monitor the total current in a three-phase full-wave rectifier circuit.

7 Claims, 3 Drawing Figures

INVENTOR:
ROBERT P. DEPUY,
BY Albert S. Richardson Jr.
ATTORNEY 3,739,274

DIRECT CURRENT MEASURING SYSTEM

BACKGROUND OF THE INVENTION

Field of the Invention

This invention relates to a direct current measuring system, and more particularly to a direct current measuring system which may be used in an electrical system wherein the magnitude of the direct current undulates periodically to zero.

This invention is particularly well suited for measuring the current output of high current electric power rectifiers. Many systems are presently known for the measurement of direct current of high magnitudes (e.g., over 500 amperes). Typical of these systems are the use of a shunt in the direct current line, but shunts can be undesirably large and expensive and they do not afford isolation between the power circuit and the control or metering circuits. Another prior art measuring system, such as shown in British Pat. No. 1,099,804, uses magnetizable core material, and as a consequence such a system is exposed to error due to D.C. fields. One particular type of magnetic system for metering direct current uses a Hall generator, but this can be undesirably costly to manufacture and is still subject to D.C. field errors in operation.

In the A.C. measuring art, it has been known to use a non-magnetic pickup device such as a toroidal coil to produce a signal proportional to the time rate of change or differential of the current to be measured. By feeding this signal to an RC integrator, a signal whose waveshape, is a replica of the alternating current being measured can be produced. However, due to leakage and time constants in the components and circuit, such a system tends to give erroneous results when applied to direct current measurement.

SUMMARY OF THE INVENTION

It is a general objective of my invention to provide, for measuring direct current, an improved system characterized by isolation between primary and secondary circuits and relatively low cost and high accuracy.

In one form of the invention, a pickup device is coupled to a conductor in which current periodically undulates to zero, and it generates a signal proportional to the rate of change of the current to be measured. This signal is fed to an integrating amplifier. A circuit, which may be a direct current restorer circuit, senses the output signal of the integrating amplifier and supplys a compensating signal to the input of the integrator whenever the output signal attempts to pass a predetermined reference level. For example, if the polarity of the output signal of the integrator circuit is intended to be relatively positive while current is flowing in the conductor, the D.C. restorer circuit would feed back a compensating signal if the output signal goes below zero volts (i.e., becomes negative). The integrating amplifier will respond to this compensating signal by rapidly returning the output signal to the zero level.

In one embodiment, this invention may be advantageously used to measure total current in an N-phase full-wave rectifier circuit. This is accomplished by coupling a pickup device to each phase of the full wave rectifier circuit. The outputs of the N pickup devices are fed to a group of N compensated integrators. The output of each integrator is fed into a summing circuit which produces a voltage level which is an accurate measure of the total current flowing in the N phase full wave rectifier circuit.

BRIEF DESCRIPTION OF THE DRAWINGS

While the specification concludes with claims particularly pointing out and distinctly claiming the subject matter which is regarded as the invention, it is believed the invention will be better understood from the following description taken in connection with the accompanying drawings in which:

DESCRIPTION OF THE PREFERRED EMBODIMENTS

Figure 1:
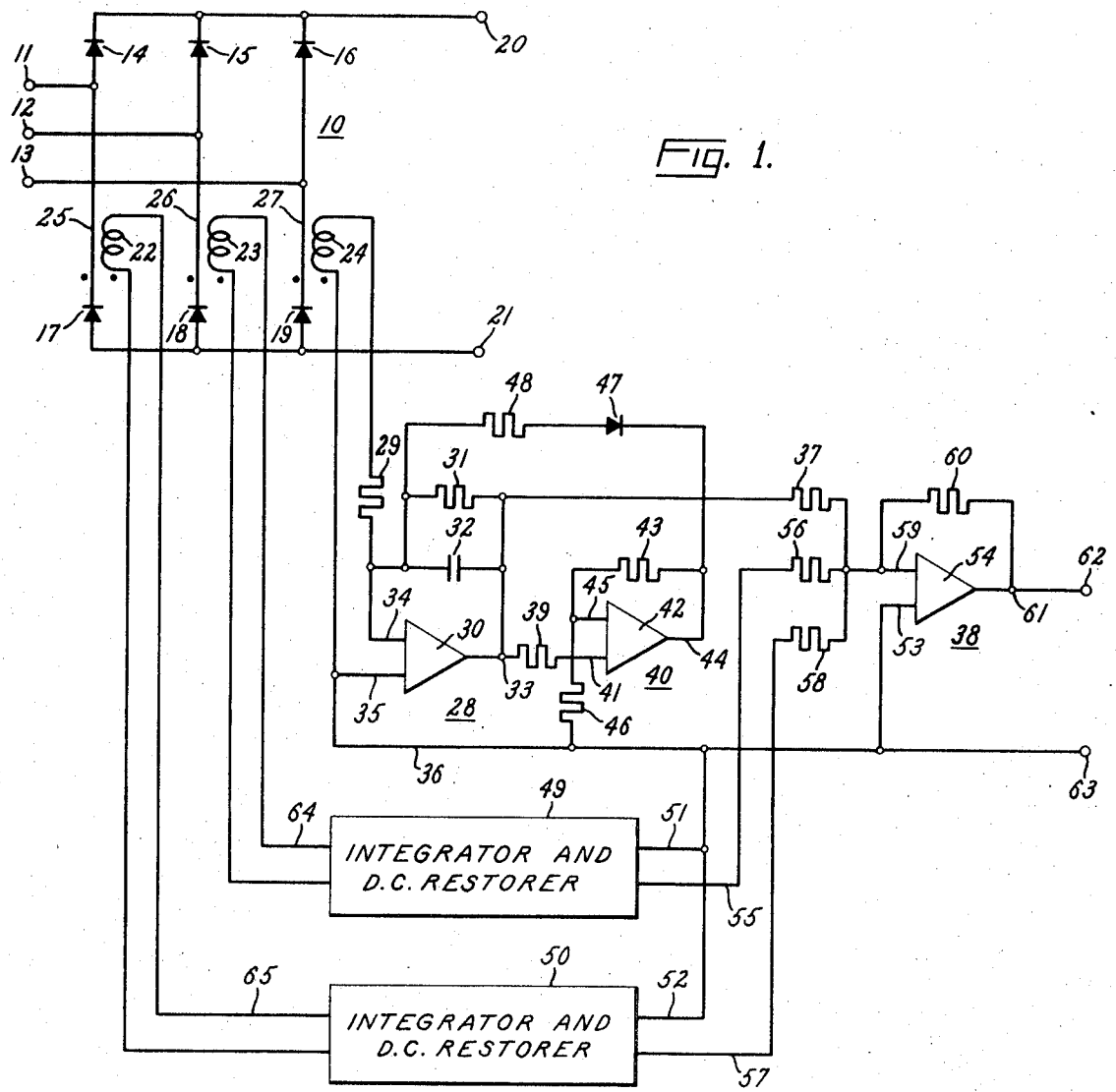
FIG. 1 is a schematic diagram partially in block diagram form of an embodiment of the invention.

Referring now, more particularly, to FIG. 1 to illustrate the principles of the invention, there is shown a schematic diagram partially in block diagram form wherein the total current of a three phase full wave rectifier circuit 10 is monitored or measured. Although the principles of the invention will be described in the context of monitoring the total direct current of a three-phase full-wave rectifier, it is understood that the invention may be used to monitor the current in a rectifier containing any number of phases or may be used to monitor any direct current which somewhat periodically has a magnitude of zero. The illustrated rectifier has three a-c terminals 11, 12, and 13 which are respectively energized by the alternating voltages of a source of three-phase power not shown. Six electric valves 14–19 are interconnected as shown in FIG. 1 in a conventional three-phase full-wave double-way bridge configuration which is well known in the art. At intervals of 60 electrical degrees, the six valves of this bridge will sequentially commence conducting current which periodically undulates to a zero. Although there are cyclic intervals of zero current in each valve, these intervals are staggered and the total rectified direct current is continuously supplied to a suitable load (not shown) which is connected across the D.C. terminals 20 and 21 of the rectifier 10. In FIG. 1 the valve in each leg of the rectifier circuit 10 is depicted by only a single rectifying symbol, but in practice it may comprise a high-current array of individual devices in parallel. Furthermore, my invention is useful in rectifier circuits employing controlled valves (thyristors) in lieu of the simple rectifiers (diodes) which have been shown for purposes of illustration.

Pickup devices 22, 23 and 24 are coupled to three of the rectifier legs or branch conductors 25, 26, and 27 respectively. Pickup devices 22 through 24 may be toroidal coils or any other suitable type of device which generates a signal proportional to the time rate of change of the current being sensed. The conventional dot coding used in the transformer art is applied to pickup devices 22, 23 and 24. It will be seen that pickup device 22 produces a positive potential on its dotted output terminal when forward current through conductor 25 is rising and a negative potential when this amount is falling.

The output of pickup device 24 is applied to the input of integrator 28 through resistor 29. Integrator 28 is comprised of an operational amplifier 30, well known in the art, and an integrating capacitor 32 connected between the output 33 and inverting input 34 of op amp 30. A resistor 31 is connected across the capacitor 32. The inverting input 34 of the op amp 30 is connected to the resistor 29, and the non-inverting input 35 is connected to common line 36. As so connected, the approximate D.C. gain of amplifier 30 is determined by the resistance ratio of resistor 31 to resistor 29. The values of these resistors and the other resistors to be discussed hereinafter may be selected by one skilled in the art in accordance with the teachings of this specification.

The output of integrator 28 at point 33 is fed through resistor 37 to summing circuit 38 and through resistor 39 to noninverting terminal 41 of a direct current restorer means 40. Direct current restorer means 40 comprises an operational amplifier 42, well known in the art, resistor 43 connected between output terminal 44 and inverting input terminal 45, and resistor 46 connected between inverting terminal 45 of operational amplifier 42 and common line 36. The gain of operational amplifier 42 depends on the resistance ratio of resistor 43 to resistor 46. The output signal at terminal 44 of operational amplifier 42 is fed through diode 47 and resistor 48 to inverting input terminal 34 of operational amplifier 30 when the signal is of proper polarity to pass through diode 47.

Integrator and D.C. restorer 49 and 50, shown in block diagram form, contain circuits identical to integrator 28 and direct current restorer means 40. Integrator and D.C. restorer 49 obtains an input signal from pickup device 23 and integrator and D.C. restorer 50 obtains its input signal from pickup device 22. The common output terminal 51 of integrator and D.C. restorer 49 and common terminal 52 of integrator and D.C. restorer 50 are tied to common terminal 36 which in turn is tied to non-inverting input terminal 53 of operational amplifier 54 of summing circuit 38. The other or high output terminal 55 of integrator and D.C. restorer 49 is connected through resistor 56 and the high terminal 57 of integrator and D.C. restorer 50 is connected through resistor 58 to inverting input terminal 59 of operational amplifier 54. Summing circuit 38 comprises operational amplifier 54 and resistor 60 connected between output terminal 61 and inverting input terminal 59. The output signal is taken across terminals 62 and 63 of FIG. 1 and can be used as desired, such as for metering or control purposes.

Figure 2:
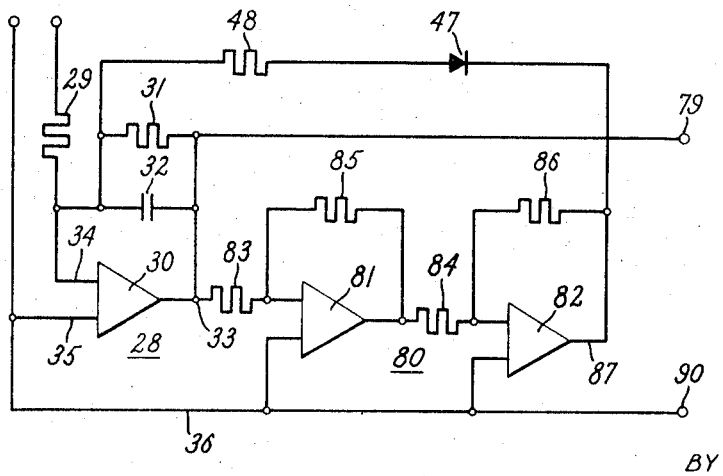
FIG. 2 is a schematic diagram of a modification of the integrator-D.C. restorer utilized with the invention.

Referring now to FIG. 2, there is shown an alternate embodiment of the direct current restorer means 40 of FIG. 1. Here output 33 of operational amplifier 30 is fed to D.C. restorer means 80 comprising two inverting operational amplifiers 81 and 82 in series. Input resistances 83 and 84 and feedback resistances 85 and 86 are respectively associated with the op amps 81 and 82. Both operational amplifiers 81 and 82 are inverting and therefore produce the same resulting output signal on terminal 87 of operational amplifier 82 as is produced on output terminal 44 of operational amplifier 42 in FIG. 1. The output signal on output terminal 87 of operational amplifier 82 is fed back through series connected diode 47 and resistor 48 to input terminal 34 of integrator 28. The output signal of this embodiment is taken across output terminals 79 and 90.

Figure 3:
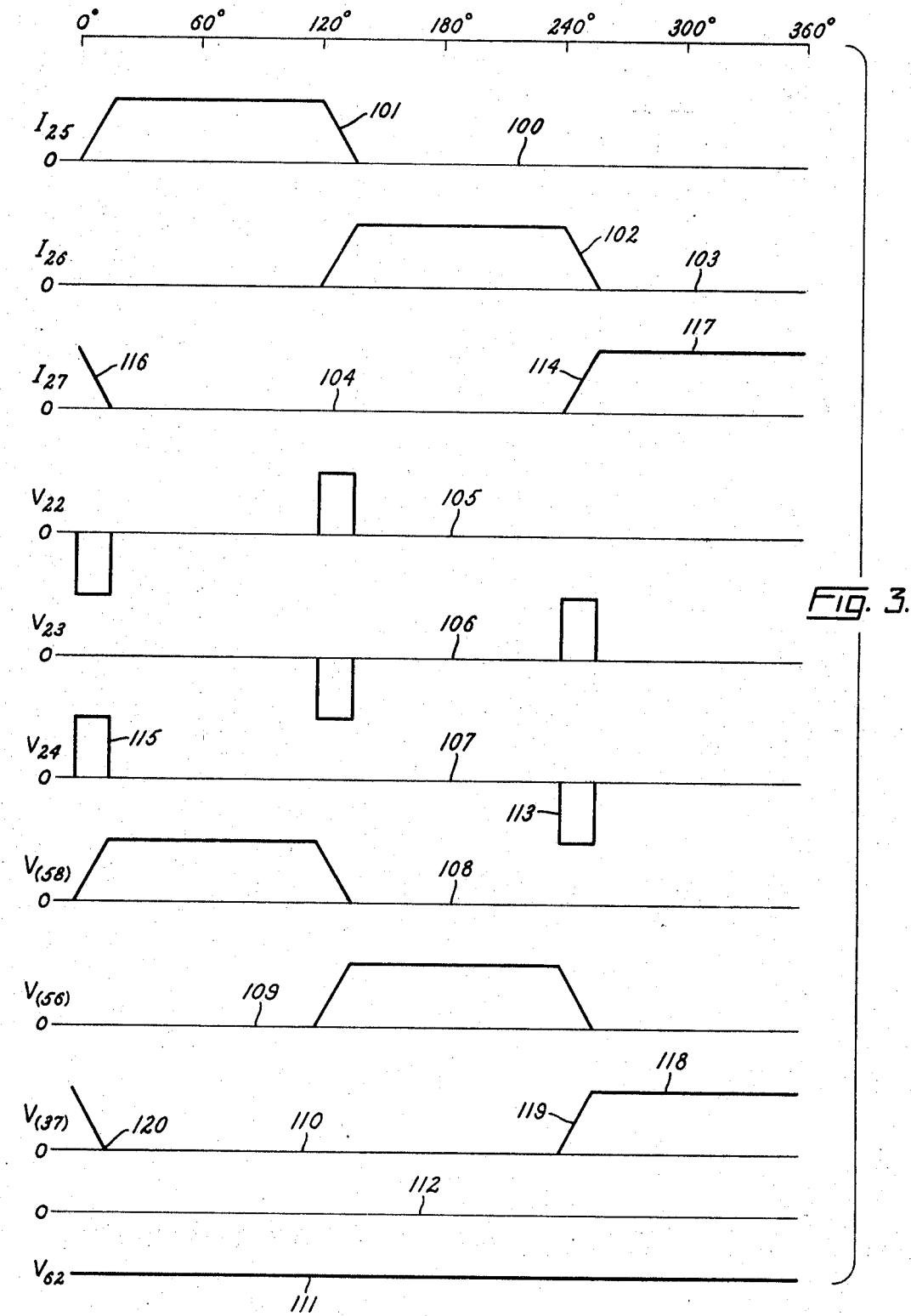
FIG. 3 is a drawing of electrical wave shapes at selected points in the circuit.

Referring now to FIG. 3, there is shown selected electrical wave shapes at various points in the circuit of FIG. 1 for one full cycle of operation. All of the selected electrical waveshapes are shown with respect to a zero reference level line as indicated in FIG. 3. There is shown on reference line 100 a current wave form 101 of the current flowing through conductor 25 of FIG. 1. While my invention is operative to measure current having any given waveshape that periodically undulates to zero, the particular waveshape illustrated has been simplified by assuming linear rate of change and flat tops. The flat tops are an approximately correct representation of current flowing through the respective legs of the three-phase full-wave rectifier 10 when connected to a highly inductive load. Current wave form 102 on reference line 103 represents the wave form of the current flowing through conductor 26, and the current wave form on line 104 represents the current flowing through conductor 27 of FIG. 1. The voltage wave forms on line 105 represent the output signal voltage of pickup device 29. The voltage wave forms on lines 106 and 107 represent the output voltage wave forms of pickup devices 23 and 24, respectively. The output voltage wave forms on lines 108, 109, and 110 represent the voltages supplied from the integrating circuits to resistors 58, 56 and 37, respectively. The negative output voltage level 111 taken with respect to reference line 112 represents the output voltage across terminals 62 and 63 of FIG. 1.

OPERATION

The operation of FIG. 1 will be described in detail in connection with the electrical wave form drawings of FIG. 3. The operation of FIG. 2 will not be described in detail as its operation is very similar to that of FIG. 1 with the exception of the use at two inverting amplifiers 81 and 82 to perform the function of non-inverting amplifier 42 of FIG. 1. In operation, the three phases of the alternating current supply are connected respectively to terminals 11, 12, and 13 of three-phase full-wave rectifier 10. Three-phase full-wave rectifier 10 with a large inductive load connected across terminals 20 and 21 operates in a conventional and well-known manner to produce approximately the current wave forms shown on lines 100, 103 and 104 in current conductors 25, 26 and 27, respectively. The outputs of pickup devices 22, 23 and 24 are shown on lines 105 through 107, respectively. The wave forms on lines 105 through 107 represent voltages proportional to the rate of change of the current wave forms on lines 100, 103 and 104, respectively. For example, voltage pulse 113 represents the differentiation of the leading edge 114 of current in conductor 27. Voltage wave form 115 represents the differentiated slope 116 of this current as it falls toward zero at the end of its conducting period. There is no output signal from pickup device 24 between voltage wave forms 113 and 115 because current in conductor 27 is not then changing (being either zero or at its constant steady state magnitude 117).

The voltage wave form on line 107 is fed through integrator circuit 28 to produce an output voltage wave form 118 on output terminal 33 of operational amplifier 30. It is noted that the negative voltage wave form 113 from pickup device 24 produces a positive going output 119 on terminal 33 due to the fact that input voltage wave form 113 is fed to inverting input terminal 34 of operational amplifier 30. Thus, the wave form on reference line 107 generated in pickup device 24 is applied to input terminal 34 of integrating circuit 28 to produce on output terminal 33 of operational amplifier 30, a wave form 118 as shown on reference line 110. It will be observed that the waveshape 118 of this output signal is substantially a replica of the current in the corresponding branch conductor 27 of the rectifier 10. However, after the application of pulse 115 to integrator 28, at point 120 on line 110, the output of integrator 28 tends to be driven below zero, i.e., negative, due to the discharge of capacitor 32 through resistor 31. This negative going signal is sensed on input 41 of operational amplifier 42 of DC restorer means 40 to produce a negative going signal on output terminal 44. The magnitude of the latter signal depends on how much the value of the integrator output signal differs in a negative sense from the zero reference level. Current now flows in the feedback path which the diode 47 and the resistor 48 provide between the output terminal 44 of the operational amplifier 42 and the input terminal 34 of the operational amplifier 30. This negative going compensating signal on input terminal 34 causes the integrator 28 rapidly to restore the output signal on output terminal 33 to a zero or non-negative level while reducing the compensating signal to zero. Therefore the DC restorer circuit 40 corrects for the drift of the output of the integrator each cycle by ensuring that its output signal is zero while the current being measured is zero. Since, the output signal is always at the zero reference level at the start of each current-conducting period, a cumulative error is prevented. It will be understood that all of the polarities and the diode 47 could be reversed to produce a positive voltage output level across terminals 62 and 63 and, in such a case, the DC restore would function to prevent the signal on output 33 of operational amplifier 30 from tending to go in a positive direction.

The output of pick up device 23 shown on reference line 106 of FIG. 3 is applied via line 64 to integrator and D.C. restorer 49. The output signal of pick up device 22 shown on line 105 is applied to input terminal 65 of integrator and D.C. restorer 50. The output on line 55 shown on reference line 109 of FIG. 3 and the output on line 57 shown on reference line 108 of FIG. 3 are combined with the output of integrator circuit 28 in summing circuit 38 to produce a negative voltage output level 111 with respect to reference line 112 shown in FIG. 3, across output terminal 62 and 63 shown in FIG. 1. The output 111 is therefore a measure of the magnitude of the total current that the rectifier 10 is supplying to the connected load.

It will be apparent to those skilled in the art that the measuring system described herein may be used for monitoring or metering any direct current signal which contains somewhat periodic zero magnitudes. It is also apparent that various changes and modifications may be made in the circuitry, or different devices used to produce the same function in the circuit. For example, various types of pick up devices may be used, or various numbers of amplifiers inverting or non-inverting may be adapted to perform the same function.

In view of the above, it will be apparent that modifications and variations are possible within the scope and spirit of the above teachings. It therefore is to be understood that within the scope of the appended claims, the invention may be practiced other than as specifically described.

What is claimed as new and desired to be secured by Letters Patent of the United States is:

1. A current measuring system for use in a direct current electrical system in which the current periodically undulates to zero, comprising:
   a. means for generating a signal proportional to the rate of change of direct current in a conductor of said electrical system;
   b. integrating means supplied with an input signal comprising said rate-of-change signal for producing an output signal which is the integral of the input signal, whereby the waveshape of said output signal is substantially a replica of said current;
   c. means operative in response to said output signal passing a predetermined level while said current is zero to produce a compensating signal dependent on the difference between the value of said output signal and said predetermined level; and
   d. means for feeding back said compensating signal to the input of said integrating means in a sense that causes said integrating means to restore said output signal to said predetermined level while reducing said compensating signal to zero.

2. A current measuring system as recited in claim 1 wherein said predetermined level is zero, said output signal has a relatively positive polarity while there is current flowing in said conductor, said compensating signal is produced if the polarity of said output signal becomes negative, and said integrating means rapidly restores said output signal to zero in response to said compensating signal.

3. A direct current measuring system for use in an N-phase full-wave rectifier circuit having N branches which sequentially commence conducting direct current that periodically undulates to zero, comprising:
   a. N first means respectively adapted to generate signals proportional to the rates of change of current in said branches;
   b. N second means respectively supplied with the rate signals generated by said first means for producing output signals proportional to the integrals of the associated rate signals, whereby the waveshape of each output signal is a substantial replica of the corresponding branch current;
   c. N third means for sensing the output signals of the respective second means and for supplying each of the latter means with a compensating signal when its output signal passes a predetermined level; and
   d. summing means having N inputs and an output, the output signals of all of said second means being respectively applied to said inputs and said summing means being operative to produce at its output a signal proportional to the total current conducted by said N branches of said full-wave rectifier circuit.

4. A direct measuring system as recited in claim 3 wherein said second means comprise integrating amplifiers.

5. A direct current measuring system as recited in claim 3 wherein each of said third means comprises a direct current restorer means which ensures that the output signal of the associated second means is at said predetermined level at the start of each current conducting period of the corresponding branch of the rectifier circuit.

6. A current measuring system for use in a direct current electrical system in which the current periodically undulates to zero, comprising:

a. means for generating a signal proportional to the rate of change of direct current in said electrical system;
b. an integrating amplifier, including an input to which said signal is applied, an output, and a capacitor connected between said input and said output, said integrating amplifier being designed to produce at its output a signal which is proportional to said current; and
c. feedback means connected between said input and said output, said feedback means being operative to sense the signal at said output of said integrating amplifier and to supply said input of said integrating amplifier with a compensating signal when the signal at said output passes a predetermined level due to discharge of said capacitor, said integrating amplifier being operative to rapidly restore the signal at its output to said predetermined level in response to said compensating signal.

7. A current measuring system as recited in claim 6 wherein the signal at said output of said integrating amplifier is supplied to a metering means.

* * * * *